US005439063A

United States Patent [19]

Anders et al.

[11] Patent Number: 5,439,063

[45] Date of Patent: Aug. 8, 1995

[54] COMPRESSED-AIR SCREW OR BOLT TIGHTENER, ESPECIALLY AN IMPULSE OR A TORQUE SCREW OR BOLT TIGHTENER

[75] Inventors: Heinz G. Anders; Konrad K. Kettner, both of Aalen, Germany

[73] Assignee: Cooper Industries, Inc., Houston, Tex.

[21] Appl. No.: 169,463

[22] Filed: Dec. 17, 1993

[30] Foreign Application Priority Data

Dec. 18, 1992 [DE] Germany ................ 4243068

[51] Int. Cl.[6] .............................................. B23Q 15/12

[52] U.S. Cl. ...................................................... 173/177

[58] Field of Search ................... 173/2, 176, 177, 178, 173/168, 169

[56] References Cited

U.S. PATENT DOCUMENTS

| | | | |
|---|---|---|---|
| 3,033,236 | 5/1962 | Rayman et al. | 173/177 |
| 3,796,131 | 1/1974 | Workman, Jr. et al. | 173/177 |
| 4,161,221 | 7/1979 | Carlin et al. | 173/176 |
| 4,375,121 | 3/1983 | Sigmund | 173/176 |
| 5,113,949 | 5/1992 | Ohkubo et al. | 173/177 |
| 5,117,919 | 6/1992 | Borries et al. | 173/177 |
| 5,315,501 | 5/1994 | Whitehouse | 173/176 |

*Primary Examiner*—Scott A. Smith

*Attorney, Agent, or Firm*—William B. Patterson; Eddie E. Scott

[57] ABSTRACT

A compressed-air screw or bolt tightener having a driving motor which drives a driving shaft for a screwing or tightening tool is disclosed. The motor is operated by compressed air and a control valve for switching the compressed-air supply to the screw or bolt tightener on or off. A pressure-regulating valve is used to regulate the kinetic energy of the screw or bolt tightener.

6 Claims, 3 Drawing Sheets

COMPRESSED-AIR SCREW OR BOLT TIGHTENER, ESPECIALLY AN IMPULSE OR A TORQUE SCREW OR BOLT TIGHTENER

BACKGROUND OF THE INVENTION

1. Field of the Invention

The subject matter of this invention concerns a compressed-air screw or bolt tightener according to the precharacterizing part of Patent claim 1, especially an impulse or a torque screw or bolt tightener.

2. Summary of the Invention

Impulse or torque screw or bolt tighteners which are used for a number of different screwing and tightening processes are fitted with a valve with which the bolt or screw tightener is switched on and off. The valve is located along the compressed-air supply line that leads to the screw or bolt tightener. This valve can be actuated manually by the operating personnel or by an electronic measuring and control device. Prior art screw or bolt tighteners, when switched on, operate at a constant pressure throughout the screwing and tightening process. As a result, the same kinetic energy is used to fasten both an M10 screw and an M8 screw. This is undesirable. In certain cases, this constant kinetic energy that is delivered to the screw or bolt tightener may induce the tool to penetrate the material to which the screw or bolt is to be applied and cause a rupture. This may result in damage to the screwed connection. With self-tapping screws, for example, the resistance is higher at the beginning of the screwing process; however, after the sheet metal has been perforated, this resistance drops to nearly zero. Yet, the prior art bolt or screw tightener uses the same high force, and the screw is struck at full force, which may cause the screw or the screw thread to rupture.

The present invention eliminates the problem of the prior-art screw or bolt tighteners mentioned by using a simple structural design which allows adjustment to the actual screwing and tightening needs.

DESCRIPTION OF THE PREFERRED EMBODIMENT

This problem is solved according to this invention by the measures contained in the characterizing part of claim 1; any further developments of this invention are characterized by the features contained in the dependent claims.

According to this invention, the control valve in the compressed-air supply line that leads to the screw or bolt tightener is designed in the form of a pressure-regulating valve which is adjustable with respect to the pressure and the compressed-air supply. This makes it possible to adjust the compressed-air supply to the screw or bolt tightener and thus the kinetic energy delivered by the screw or bolt tightener to the actual situation. These measures also ensure that the accuracy of the screwed connections varies as little as possible, which is of special significance particularly in the case of series assembly. To accomplish this, various control mechanisms can be used. For example, the tightening process may start at a certain cut-in pressure which, after reaching a preset threshold MS of the torque, is increased, for example, to a higher final pressure, which ensures that the screwing and tightening process takes place at different levels of kinetic energy. This is particularly useful for various groups of products, for example, if a magazine containing different sizes of screws and nuts is connected to an electronic measuring and control unit; as a specific nut is withdrawn, the pressure-regulating valve is automatically set to a certain initial or cut-in pressure by the electronic measuring and control unit, and after a preset threshold value of the torque has been reached, a predetermined final pressure is set as a function of the size of the nut for the remaining screwing and tightening process.

According to another variation of this invention, a freely programmable cut-in pressure is set. After a threshold value of the torque has been reached, the pressure is switched to a variable value, and the increase or decrease in pressure is automatically calculated on the basis of the increase or decrease of the torque.

The pressure-regulating valve makes it possible to adjust the pressure to any particular screwing and tightening situation; this means that if, for example, less kinetic energy is required for the screwing and tightening process, the flow of compressed air through the pressure-regulating valve is throttled as required. As explained earlier, this may be accomplished automatically or according to predetermined constant values. This control can be used both with an impulse and with a torque screw or bolt tightener.

The pressure-regulating valve is preferably located outside the tool in the compressed-air supply line, thus making it possible to use standard components for the pressure-regulating valve. It is, of course, also possible to integrate the pressure-regulating valve directly into the screw or bolt tightener, thus making it possible for the operator to adjust the kinetic energy on site to the actual screwing and tightening situation. However, in this case, it is not possible to use standard components for the pressure-regulating valve; instead, the pressure-regulating valve has to be adapted to the tool or vice versa. The result is that the tool itself will be larger.

With respect to the measures according to this invention, it is very important that the screwing and tightening process can be modified. For example, in the case of a hard material into which the screw is to be screwed, where fewer impulses are accompanied by a correspondingly higher increase in torque, the increase in torque can be controlled or, more precisely, reduced by means of the pressure-regulating valve, which results in an improvement of the screwing accuracy.

Below, this invention will be described in greater detail on the basis of a practical example shown in the drawings.

DESCRIPTION OF THE PREFERRED EMBODIMENT

Figure 1:
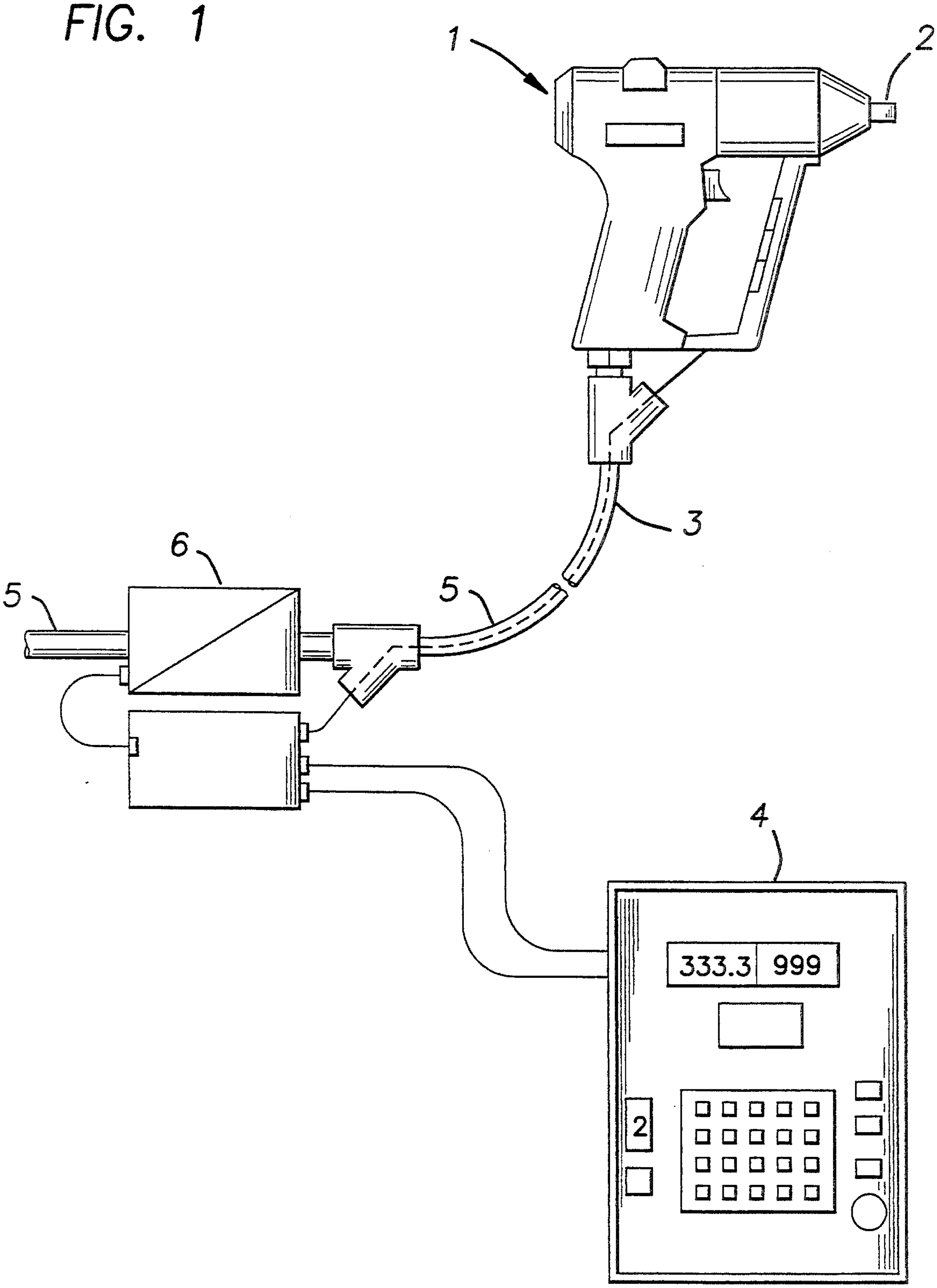
FIG. 1 is a diagrammatic view of a screw or bolt tightener which is connected to a control unit.

FIG. 1 shows a screw or bolt tightener 1 which comprises a conventional-type pneumatically operated driving motor. Its driving shaft 2 is designed to be able to hold a nut or a nut insert. In addition, the screw or bolt tightener 1 is fitted with a conventional device for recording the torque so that the torque characteristics of a screwed connection can be determined. The signals of the torque characteristics are transmitted via signal line 3 to an external electronic measuring and control unit 4 where the signals are compared to the desired values to control a valve 6 which is located in the compressed-air line 5.

Valve 6 has the form of a pressure-regulating valve which ensures that the compressed-air supply or the pressure of the compressed air is controlled as a function of the setting of the valve. This differs from a valve that is simply triggered to open and close in that it is possible to adapt the kinematic [sic] energy delivered by the screw or bolt tightener during the screwing and tightening process to the actual situation by appropriately setting the pressure-regulating valve 6.

Figure 2:
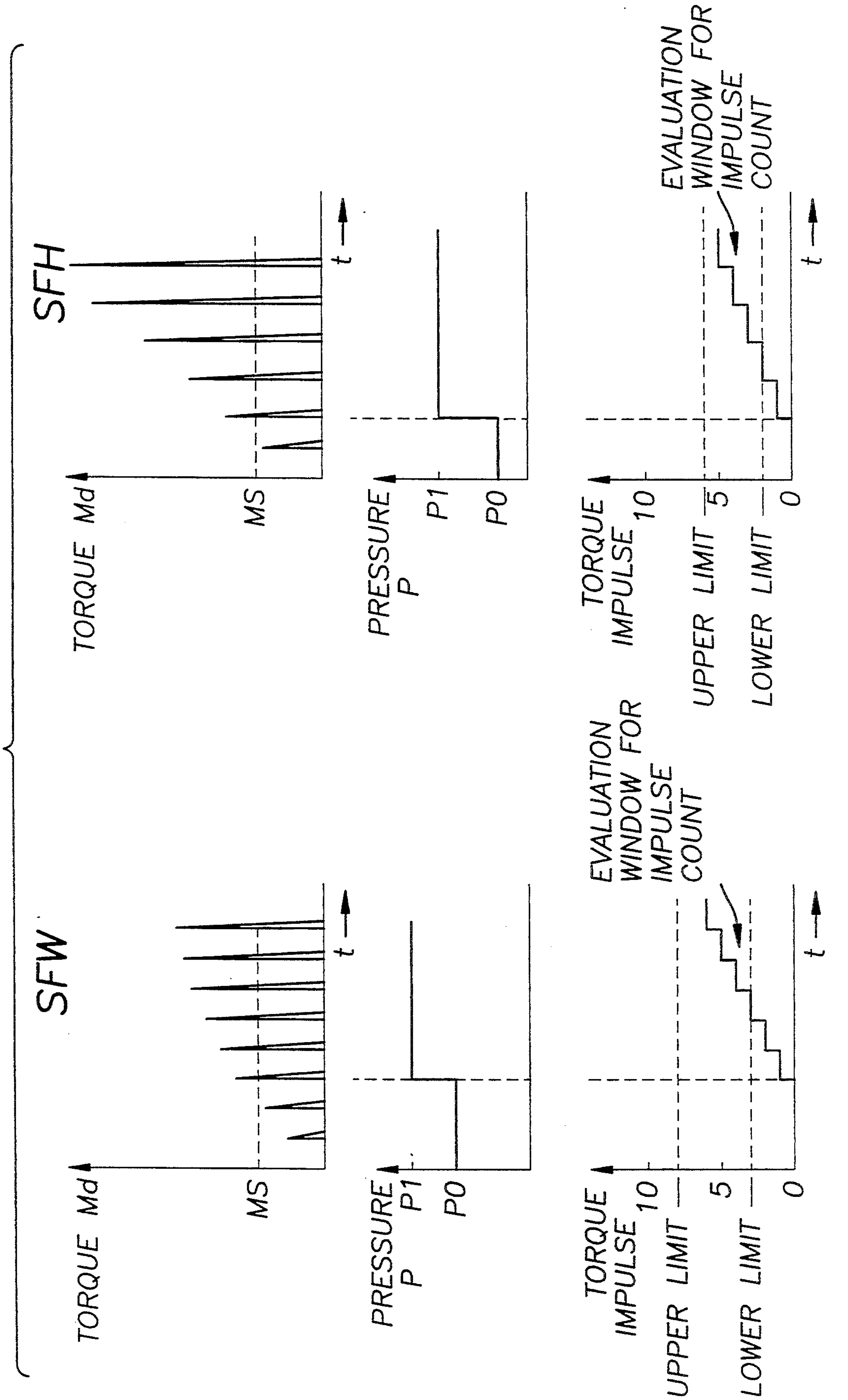
FIG. 2 shows a diagram of the torque characteristics of an impulse screw or bolt tightener.

FIG. 2 shows a control unit which makes it possible to set the pressure-regulating valve and thus the compressed air delivered to the screw or bolt tightener as a function of the torque value and the hardness of the material into which the screw is to be screwed. The cut-in pressure Po and the final pressure P1 can be programmed, i.e., these values are fixed values. This offers advantages especially in the case of a relatively large machine with a magazine that contains several different screws and bolts as certain predetermined values can be assigned to the individual screw and bolt sizes. When a particular size if screw or bolt is taken from the magazine which is connected to the external electronic measuring and control unit 4, the pressure-regulating valve is set, in this case for a cut-in pressure Po and a final pressure P1, with the values Po and P1 depending on the size of screw or bolt chosen. At the beginning of the tightening process, the pressure of the pressure-regulating valve is set to value Po (as seen in FIG. 2). As soon as the torque exceeds a specific predetermined threshold value MS, the pressure-regulating valve is switched to pressure P1. After the valve has been reset, the tightening process continues at a different kinetic energy corresponding to pressure P1 which is higher than pressure Po. The left drawing in FIG. 2 shows a case in which the material into which the screw is to be screwed is soft, the right drawing shows a case in which the material into which the screw is to be screwed is hard, which is marked by few impulses or torque peaks but by a higher torque increase from one pulse to the next.

Figure 3:
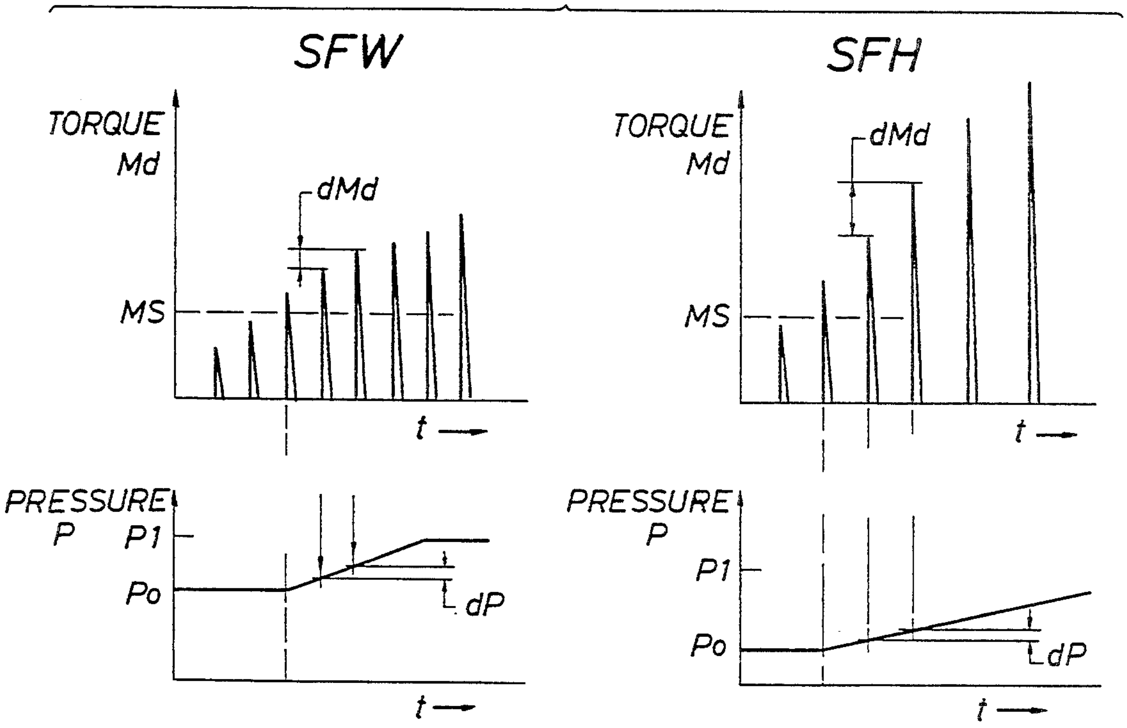
FIG. 3 shows the diagram of the torque characteristics of an impulse screw or bolt tightener with a different control unit.

FIG. 3 shows a practical example of an impulse screw or bolt tightener, for which the cut-in pressure Po can be freely programmed and in which the pressure-regulating valve is switched to a variable pressure increase as soon as a predetermined threshold value MS of the torque has been reached. The variable pressure increase dP is automatically calculated on the basis of the increase of the torque dMd. Again, the left drawing of the figure refers to a case in which the material into which the screw is to be screwed is soft and the right drawing shows a case in which the material into which the screw is to be screwed is hard. The advantage of this particular example is that the initial pressure of the pressure-regulating valve for a specific nut size is set to a predetermined value Po at the beginning of the tightening process and that an automatic pressure regulation takes place as a function of the increase of the torque as soon as a specific threshold value MS has been reached. This means that the pressure of the compressed-air delivered to the screw or bolt tightener is increased or decreased as a function of the increase in torque. Thus, the tool automatically adjusts to the actual screwing and tightening situation as soon as the threshold value MS of the torque has been exceeded. This ensures that the pressure used during the screwing and tightening process is always at the ideal level.

This type of control is to be preferred especially in the case of self-tapping screws, for example; in this case, the resistance at the beginning of the screwing cycle is very high, but as soon as the screw has penetrated the sheet metal, the torque decreases. As a result of the automatic control, the pressure drops to an appropriate value as soon as the screw has pierced the sheet metal, thus reducing the energy with which the tool operates. This means that the stress and strain on the self-tapping screw is reduced, thus considerably reducing the risk of fracturing the screw or destroying the thread.

Figure 4:
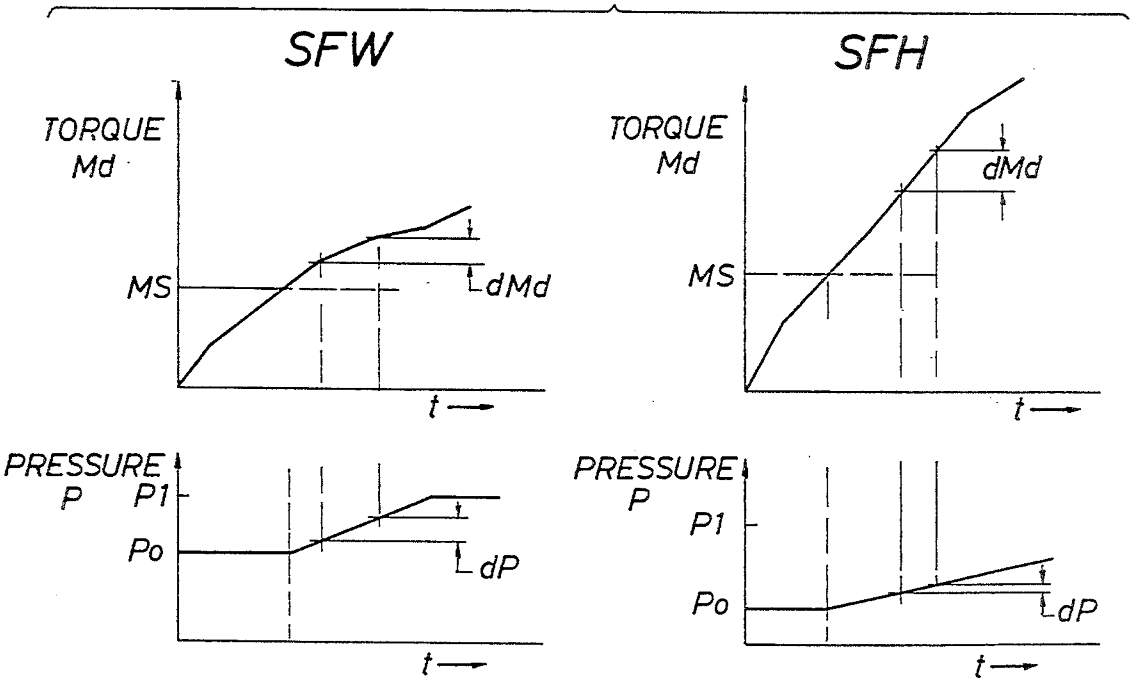
FIG. 4 shows the torque characteristics of a torque screw or bolt tightener.

FIG. 4 shows an automatic control for a torque screw or bolt tightener; in this case, a continuous curve of the torque response is seen instead of the torque peak shown in FIGS. 2 and 3. Again, the cut-in pressure Po is freely programmable, i.e., it can be adjusted to fit various product groups, and the switch to a variable pressure takes place as soon as a predetermined threshold value MS of the torque has been reached. This particular embodiment has the same advantages as the practical example described on the basis of FIG. 3.

We claim:

1. A compressed-air screw and bolt tightener comprising:

a driving shaft for a screwing tool;

a driving motor, said driving motor driving said driving shaft;

a compressed-air supply line, said supply line providing compressed-air to operate said driving motor; and a pressure-regulating control valve, said control valve constructed and arranged to switch said compressed-air supply to said driving motor on and off, said pressure-regulating control valve further constructed and arranged to regulate the kinetic energy of said driving motor by adjusting the pressure of the compressed-air supply to said driving motor.

2. The screw and bolt tightener as claimed in claim 1, wherein said pressure-regulating control valve is controlled by an electronic measuring and control unit.

3. The screw and bolt tightener as claimed in claim 1, wherein said electronic measuring and control unit controls said pressure-regulating valve as a function of a predetermined constant value which, when said value is exceeded, said electronic measuring and control unit causes said pressure-regulating valve to adjust the pressure of said compressed-air supplied to said driving motor.

4. The screw and bolt tightener as claimed in claim 1, wherein said pressure-regulating valve is automatically controlled by said electronic measuring and control unit as a function of the torque measured by said electronic measuring and control unit during the screwing and tightening process.

5. The screw tightener as claimed in claim 1, wherein said pressure-regulating control valve is located along said compressed-air supply line.

6. The screw tightener as claimed in claim 1, wherein said pressure-regulating control valve is integrated directly into a housing containing said driving motor.

* * * * *